US011321588B2

(12) United States Patent
Lee

(10) Patent No.: US 11,321,588 B2
(45) Date of Patent: May 3, 2022

(54) SYSTEM FOR IDENTIFYING PESTS AND MONITORING INFORMATION THROUGH IMAGE ANALYSIS, AND MONITORING METHOD USING SAME

(71) Applicant: PHARMCLE CO., LTD., Gyeonggi-do (KR)

(72) Inventor: Seung Woo Lee, Gyeonggi-do (KR)

(73) Assignee: PHARMCLE CO., LTD., Gyeonggi-Do (KR)

(*) Notice: Subject to any disclaimer, the term of this patent is extended or adjusted under 35 U.S.C. 154(b) by 128 days.

(21) Appl. No.: 16/758,482

(22) PCT Filed: Oct. 17, 2018

(86) PCT No.: PCT/KR2018/012272
§ 371 (c)(1),
(2) Date: Apr. 23, 2020

(87) PCT Pub. No.: WO2019/088519
PCT Pub. Date: May 9, 2019

(65) Prior Publication Data
US 2020/0250482 A1 Aug. 6, 2020

(30) Foreign Application Priority Data
Oct. 30, 2017 (KR) .................. 10-2017-0142623

(51) Int. Cl.
*G06K 9/62* (2022.01)
*G06N 20/00* (2019.01)
*A01M 31/00* (2006.01)

(52) U.S. Cl.
CPC ......... *G06K 9/6257* (2013.01); *A01M 31/002* (2013.01); *G06N 20/00* (2019.01)

(58) Field of Classification Search
CPC .................. G06K 9/00201; G06K 9/00577
See application file for complete search history.

(56) References Cited

U.S. PATENT DOCUMENTS

| 2014/0341473 | A1 | 11/2014 | Lee | |
|---|---|---|---|---|
| 2017/0027155 | A1* | 2/2017 | Ehrlich | .................. G01S 17/88 |
| 2017/0032509 | A1* | 2/2017 | Mannar | ................. G06T 7/0002 |
| 2018/0046872 | A1* | 2/2018 | Diamond | ........... G06K 9/00369 |

(Continued)

FOREIGN PATENT DOCUMENTS

| KR | 1020060070979 | 6/2006 |
|---|---|---|
| KR | 1020090043189 | 10/2007 |

(Continued)

*Primary Examiner* — Wen W Huang
(74) *Attorney, Agent, or Firm* — Mayer & Williams, PC; Stuart H. Mayer

(57) ABSTRACT

The present invention relates to a pest identification and information monitoring system through image analysis and a monitoring method using the same, and more particularly, to a pest identification and information monitoring system through image analysis, which obtains pest images by photographing pests using image input means, compares the learning model built for each pest with the pest image to calculate the degree of similarity, and specifies the pest of the acquired image based on the calculated degree of similarity, and recommends information or control methods related to the pest, and a monitoring method using the same.

11 Claims, 4 Drawing Sheets

(56) References Cited

U.S. PATENT DOCUMENTS

| | | | | |
|---|---|---|---|---|
| 2018/0075417 A1* | 3/2018 | Gordon | ............... | B64D 47/08 |
| 2018/0121764 A1* | 5/2018 | Zha | ................. | G06K 9/6267 |
| 2018/0276504 A1* | 9/2018 | Yamaguchi | ......... | G06K 9/3241 |
| 2019/0110458 A1* | 4/2019 | Liu | ................. | G06K 9/209 |

FOREIGN PATENT DOCUMENTS

| | | |
|---|---|---|
| KR | 1020100064634 | 6/2010 |
| KR | 1020130045287 | 5/2013 |

* cited by examiner

SYSTEM FOR IDENTIFYING PESTS AND MONITORING INFORMATION THROUGH IMAGE ANALYSIS, AND MONITORING METHOD USING SAME

TECHNICAL FIELD

The present invention relates to a pest identification and information monitoring system through image analysis and a monitoring method using the same, and more particularly, to a pest identification and information monitoring system through image analysis, which obtains pest images by photographing pests using APPLimage input means, compares the learning model built for each pest with the pest image to calculate the degree of similarity, and specifies the pest of the acquired image based on the calculated degree of similarity, and recommends information or control methods related to the pest, and a monitoring method using the same.

BACKGROUND ART

As the economy develops, the standard of living gradually increases, so that pests that have been inadvertently ignored in the past are now a strong alert for everyone. However, industrialization or industrial transformation generates a large amount of waste, and accordingly, pests are gradually increasing.

The pest is a concept that collectively refers to insects or animals that harm humans and livestock, and these pests eat food or textiles, causing considerable damage to lives, and excretions can carry pathogens harmful to the human body. In recent years, since these pests are on the rise due to the contaminated environment, pest removal is a major problem.

In the general living sector, pests are on the rise. As a result, the drug and service industries for eradicating pests are on the rise but there is a problem that various drugs and services cannot be used properly.

Accordingly, depending on the pests found, they must be eradicated through appropriate methods but there is a problem that it is difficult to accurately find information related to the pests.

Therefore, there is a need for a means capable of accurately recognizing pests and providing accurate information on the recognized pests. Recently, a search method through photos is general, and according to Korean Patent Registration No. 10-1390014, there have been described techniques for recognizing worms through photographs through image processing methods and systems, but there is a shortcoming in solving the above-mentioned problem.

DISCLOSURE OF THE INVENTION

Technical Problem

The present invention is to solve the above-mentioned problems, and it is an object to accurately specify the pest using the image.

In addition, the objective is to enable image analysis without high-performance equipment by using an image analysis technique using a learning model built through machine learning, rather than a traditional image analysis technique.

In addition, the purpose provides more detailed information on a specified pest to a user terminal, thereby making it easier for information consumers to access desired information.

In addition, the purpose is to easily respond to pests by recommending pesticides and pest control businesses for specified pests.

The problems of the present invention are not limited to those mentioned above, and other problems not mentioned will be clearly understood by those skilled in the art from the following description.

Technical Solution

In order to achieve the object of the present invention as described above and to realize the characteristic effects of the present invention described later, the characteristic configuration of the present invention is as follows.

A pest identifying and information monitoring system includes: an image input means configured to photograph a pest image and transmit the pest image; a central server connected to a network to receive pest image data from the image input means, analyze the pest image data, specify a pest of the pest image, and generate pest identification data; and a user terminal configured to receive the pest identification data and displays the received pest identification data on a screen.

Herein, the central server may further include: a pest machine learning unit configured to build a pest learning model through machine learning of multiple pest images; a pest database (D/B) unit configured to store a pest learning model constructed through the pest machine learning unit; and a pest image analysis unit configured to specify a pest by analyzing a pest image transmitted by the image input means using a pest learning model stored in the pest database unit.

Then, the pest image analysis unit may calculate a degree of similarity between the pest image and the learning model for each pest identifier by substituting a plurality of learning models for each pest identifier built for the pest image.

If a degree of similarity of a learning model having the highest degree of similarity among the similarities to the plurality of substituted learning models for each pest identifier is greater than or equal to a determined value, the pest image analysis unit may recognize the pest with the pest identifier of the learning model having the highest degree of similarity.

In addition, the central server may further include: a pest information database unit configured to store pest information; and a pest information supply unit configured to extract information of a pest specified through the pest image analysis unit from the pest information database unit and transmits the information to the user terminal.

In addition, the central server may further include: a detection recording unit configured to record a detection time when a pest is specified through the pest image analysis unit; and a pest trend analysis unit configured to analyze and transmit a trend of a pest based on a result value of the pest image analysis unit or the detection recording unit.

Moreover, a monitoring method using a pest identifying and information monitoring system through image analysis includes: a pest photographing step, for photographing a pest image and transmitting the pest image by an image input means; a pest analysis and specification step, for analyzing the pest image using a pest learning mode through a pest image analysis unit to specify a pest; and a pest information notification step, for transmitting the specified pest information to a user terminal by the central server.

The method may further include, before the pest photographing step, a pest learning step, for learning an image of a pest using a machine learning technique to construct a plurality of learning models separated by identifiers for each pest.

Here, the pest analysis and specification step may include calculating a degree of similarity between the pest image and the learning model for each pest identifier by substituting a plurality of learning models for each pest identifier with respect to the pest image, and if a learning model of an identifier having the highest degree of similarity is greater than or equal to a determined value, recognizing the pest of the pest image as a pest identifier of the learning model of the identifier having the highest degree of similarity.

In addition, the pest information may include at least one of a specified pest name, growth stage, breed, detection time, detection frequency, pesticide recommendation, and pest control business recommendation.

Advantageous Effects

A pest identifying and information monitoring system through image analysis according to the present invention and a monitoring method using the same accurately identify pests using an image, thereby providing more detailed information on the specified pests to a user terminal so that there is an effect that the information consumer can more easily access the desired information.

In addition, by using an image analysis technique using a learning model built through machine learning, rather than a traditional image analysis technique, there is an effect that image analysis is possible without high-performance equipment.

In addition, there is an effect of easily responding to pests by recommending pesticides and control companies for the specified pests.

The effects of the present invention are not limited to the effects mentioned above, and other effects not mentioned can be clearly understood by those skilled in the art from the following description.

MODE FOR CARRYING OUT THE INVENTION

Advantages and features of the present invention, and methods for achieving them will be clarified with reference to embodiments described below in detail. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the inventive concept is only defined by scopes of claims.

Shapes, sizes, ratios, angles, numbers, and the like for describing the embodiments of the present invention are exemplary and the present invention is not limited. In the following description, detailed descriptions of well-known functions or constructions will be omitted since they would obscure the invention in unnecessary detail.

When 'include', 'have', 'consist of', etc. mentioned in this specification are used, other parts may be added unless '~only' is used. When a component is expressed as a singular number, the plural number is included unless otherwise specified.

In interpreting the components, they are interpreted as including the error range even if there is no explicit description.

In addition, in the case of the description of the positional relationship, for example, when the positional relationship of two parts is described as '~top', '~upper', '~bottom', '~side', etc., one or more other parts may be located between the two parts unless 'straight' or 'direct' is used.

Then, in the case of a description of the time relationship, for example, when the temporal sequential relationship is described as '~after', 'following', '~then', and '~before', it can also include cases that are not continuous unless 'straight' or 'direct' is used.

Each of the features of the various embodiments of the present invention may be partially or wholly combined or combined with each other, various interlocking and driving are possible technically, and each of the embodiments may be implemented independently of each other or may be implemented together in an association relationship.

Hereinafter, preferred embodiments of the inventive concept will be described in detail with reference to the accompanying drawings.

Figure 1:
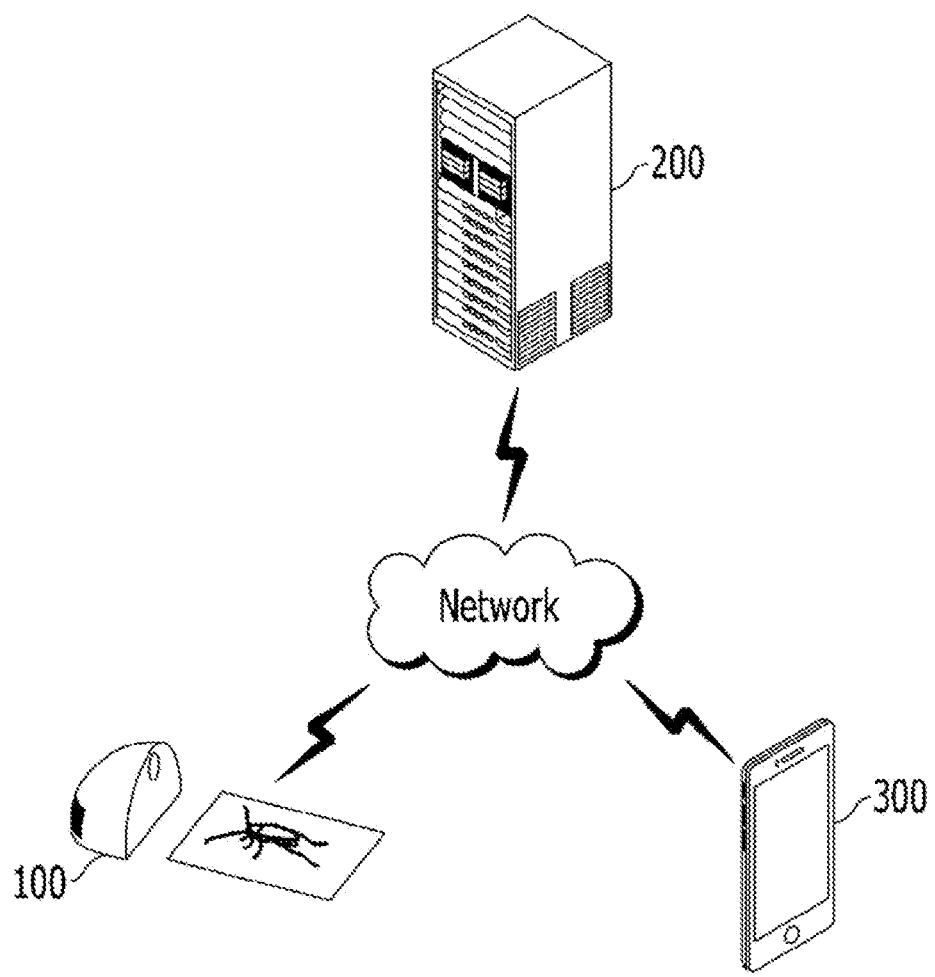
FIG. 1 is a schematic diagram of a pest identifying and monitoring system through image analysis according to an embodiment of the present invention.

FIG. 1 is a schematic diagram of a pest identifying and monitoring system through image analysis according to an embodiment of the present invention.

Referring specifically to FIG. 1, the pest identifying and monitoring system through image analysis may include an image input means 100, a central server 200, and a user terminal 300.

The image input means 100 is connected to a network to photograph a pest and transmit the photographed image of the pest to the central server 200. Here, a device equipped with a communication module that can be connected to a network and a module that can photograph images may be used as an image input means. In addition, the image includes a still image or a video image having continued still images, and still images continued in a video image is hereinafter referred to as frames.

The central server 200 may be connected to a network and analyze the images of pests received from the image input means 100 to identify pests in the images and generate pest identifying and monitoring information. The detailed description of the central server 200 will be described later in FIG. 3.

The user terminal 300 may receive the pest identifying and monitoring information generated by being specified in the central server 200 and display it on the screen. The user can respond to or take action on the pests by checking the pest identifying and monitoring information displayed on the screen.

For example, when a cockroach is photographed by the image input means 100 and an image of the cockroach is transmitted to the central server 200, the central server 200 may specify and recognize the cockroach photographed as an image, generate information such as a specified cockroach breed, growth stage, and appearance area, and transmit it to the user terminal 300. In addition, the central server 200 may recommend appropriate pesticides according to the specified cockroach breed and growth stage, or connect or recommend pest control businesses in the user's area.

Therefore, the user can check information such as the type and growth stage of the cockroach the image of which is transmitted to the user terminal 300, and obtain the appropriate pesticide information to deal with the pest emergence. This may have the effect of reducing the need for a user to search the Internet separately to eradicate pests.

In addition, since a local pest control business is recommended, pests can be eradicated by an appropriate pest control business from the user's point of view, and the local control business may also have an effect of securing customers through the present invention.

Figure 2:
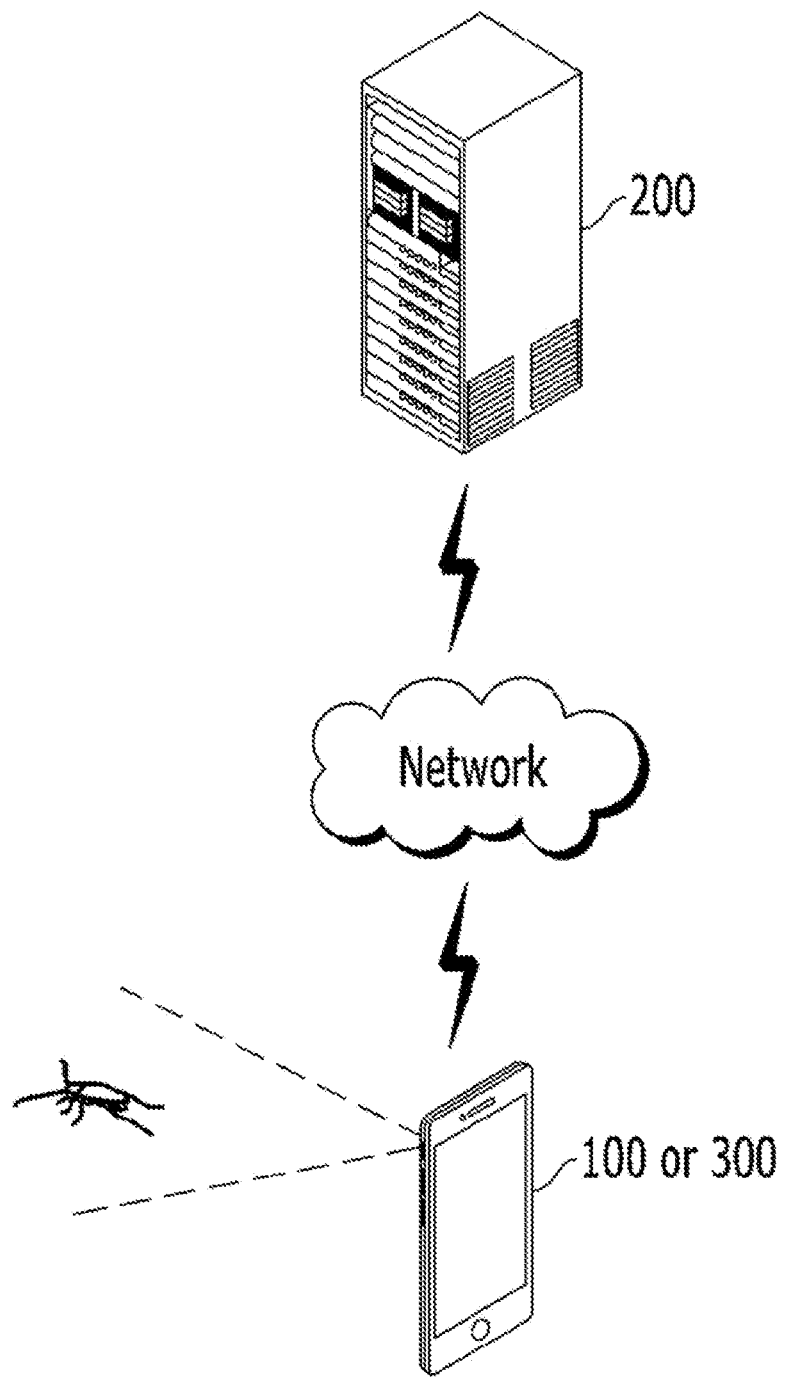
FIG. 2 is a schematic diagram of a pest identifying and monitoring system through image analysis according to another embodiment of the present invention.

FIG. 2 is a schematic diagram of a pest identifying and monitoring system through image analysis according to another embodiment of the present invention. Referring to FIG. 2 more specifically, the image input means 100 and the user terminal 300 may be the same device. That is, even if the image input means 100 and the user terminal 300 are equipped with functions in one device instead of independently separated devices, a pest identifying and information monitoring system through image analysis may be possible.

The user terminal 300 is connected to a network and is a device capable of receiving pest identifying information and monitoring information of the central server. For example, smart phones, personal computers, tablet PCs, kiosks may be preferable. Here, if the image photographing module is included, the image input means 100 and the user terminal 300 may be the same.

Figure 3:
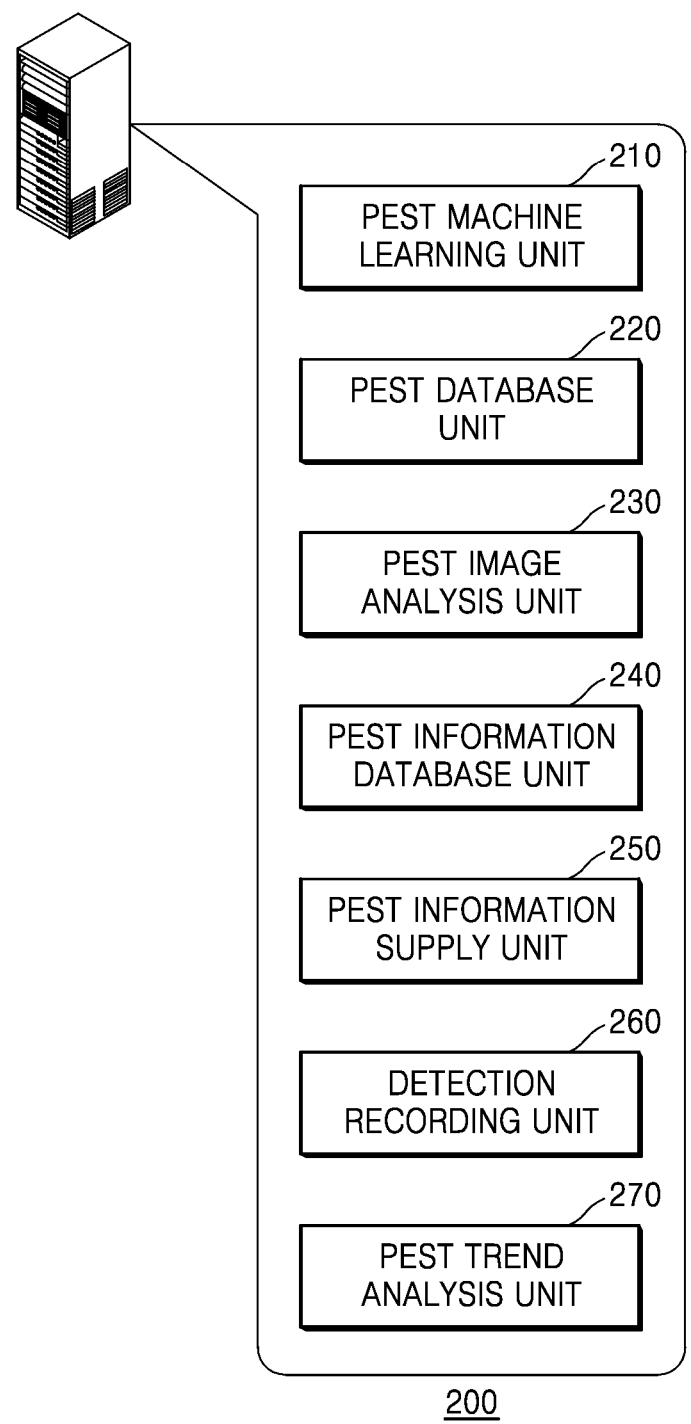
FIG. 3 is a configuration diagram of a central server of a pest identifying and monitoring system through image analysis according to an embodiment of the present invention.

FIG. 3 is a configuration diagram of a central server of a pest identifying and monitoring system through image analysis according to an embodiment of the present invention. As described in detail with reference to FIG. 3, the central server 200 may include a pest machine learning unit 210, a pest database (D/B) unit 220, a pest image analysis unit 230, a pest information database (D/B) unit 240, a pest information supply unit 250, a detection recording unit 260, and a pest trend analysis unit 270.

The pest machine learning unit 210 may build a pest learning model through machine learning of multiple pest images. Here, the learning model can continuously perform machine learning on a plurality of images corresponding to the identifier through the pest machine learning unit 210 by designating the identifier. For example, by designating a German cockroach as an identifier and performing machine learning on German cockroach images, a learning model for recognizing a German cockroach can be constructed. Here, it may be possible to extract detailed information through machine learning by specifying an identifier divided by each growth stage.

The pest database (D/B) unit 220 may store learning models learned through the pest machine learning unit 210. The number of learning models stored may increase corresponding to the number of designated identifiers.

The pest image analysis unit 230 may specify a pest corresponding to the pest image transmitted by the image input means 100 using the pest learning model stored in the pest database unit 220. A specifying method may use a learning model built in the pest database unit 220. As described in more detail, a plurality of learning models built in the pest database unit 220 may be substituted for the received pest image. The pest image analysis unit 230 may calculate the degree of similarity between the plurality of substituted training models and the received pest image. Here, the degree of similarity may represent a probability of equality between the pest image and the substituted learning model.

If the highest degree of similarity among the degrees of similarity calculated for each learning model for a plurality of identifiers is equal to or greater than a predetermined input value, the pest of the corresponding pest image can be specified as the identifier of the learning model in which the highest degree of similarity is calculated.

The pest information database (D/B) unit 240 may store detailed information for each type of pests designated as identifiers. Here, the detailed information may include name, size, life, life cycle, habit, sex, extermination method, extermination example, pesticide, and local pest control business information, but is not limited thereto. If it is information about pests, it is desirable to include it in detailed information.

The pest information supply unit 250 may extract pest information stored in the pest information database unit 240 and transmit it to the user terminal 300.

The detection recorder 260 may record the detection time for the specified pest when the pest image analysis unit 230 specifies the pest through the pest image. In addition, the location of the image input means 100 that obtains the corresponding pest image can be recorded. For example, if the image input means 100 is installed in a fixed place, the installer can pre-enter the location of the device (assuming a piece of furniture, location characteristics such as a large room, a small room, a kitchen, a boiler room, etc.) into the image input means 100 to record the detection time including information of the location.

The pest trend analysis unit 270 may analyze the pest trend based on the information obtained and analyzed by the pest image analysis unit 230 or the detection recording unit 260. It may include the movement of the detected pest, the habitat, and the characteristics of the pest. Here, for example, the characteristics of the pest may be cockroaches enjoying oily food, cockroaches looking for flour, cockroaches bearing eggs, and the like.

Figure 4:
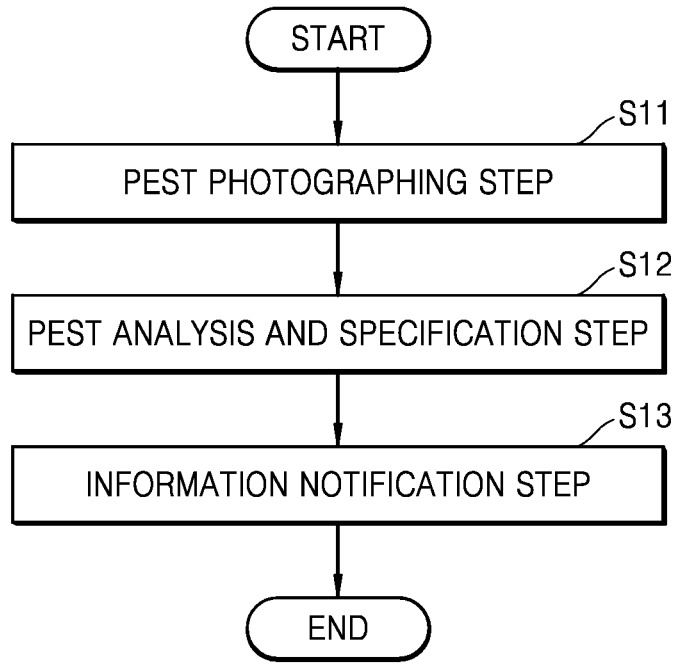
FIG. 4 is a flowchart of a pest identifying and monitoring method through an image analysis according to an embodiment of the present invention.

FIG. 4 is a flowchart of a pest identifying and monitoring method through an image analysis according to an embodiment of the present invention.

As described in detail with reference to FIG. 4, a method for identifying and monitoring pests through image analysis may include a pest photographing step S11, a pest analysis and specification step S12, and an information notification step S13.

The pest photographing step S11 is a step for photographing the pest image by the image input means 100 and transmitting it to the central server.

The pest analysis and specification step S12 is a step in which the pest image analysis unit 230 identifies the pest using the pest learning model for the photographed pest image, and the information notification step S13 is a step in which the central server 200 transmits the pest information specified to the user terminal 300.

The detailed description of the pest photographing step S11, the pest analysis and specification step S12, and the information notification step S13 is omitted because it is the same as the description of the pest identifying and monitoring system through image analysis.

However, in the information notification step S13, the pest information may include at least one of specific pest name, growth stage, breed, detection time, detection frequency, pesticide recommendation, and pest control business recommendation. In addition, it is not limited to the above-described information, and in addition, it is preferable to include detailed information about pests.

Figure 5:
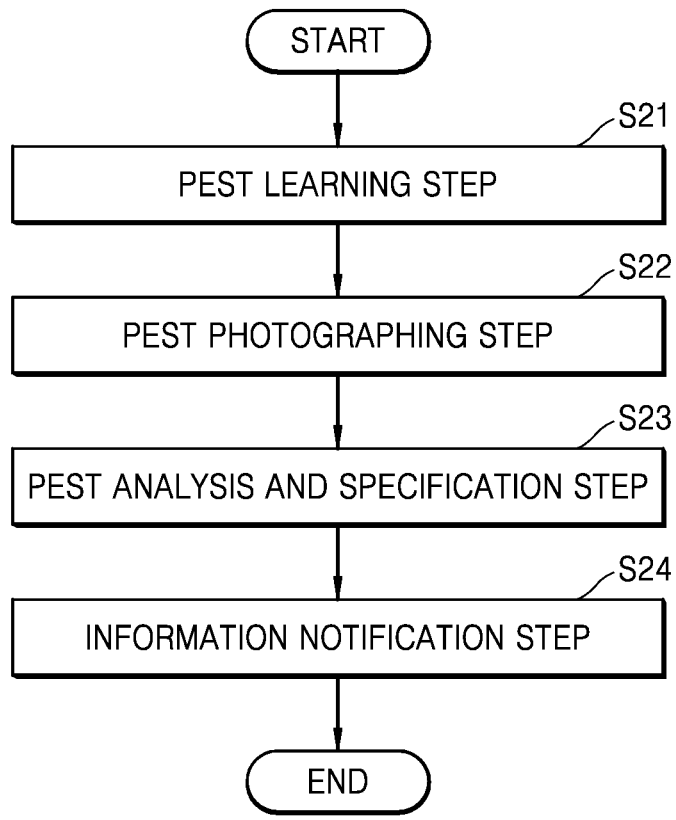
FIG. 5 is a flowchart of a pest identifying and monitoring method through an image analysis according to another embodiment of the present invention.

FIG. 5 is a flowchart of a pest identifying and monitoring method through an image analysis according to another embodiment of the present invention. As described in detail with reference to FIG. 5, a pest identifying and monitoring method through image analysis may further include the pest learning step S21 before the pest photograph step S22.

The pest learning step S21 is a step for constructing a plurality of learning models separated by identifiers for each pest by learning the images of the pest using a machine learning technique, and is a step for determining pests through the pest image analysis unit 230. In the pest learning step S21, as the number of images learned in the learning model divided by each identifier increases, the accuracy of the pest determined by the pest image analysis unit 230 increases. Since the pest image analysis unit 230 derives a probabilistic result value based on the inputted (learned) image, as the number of input data increases, the accuracy may increase.

Although the embodiments of the present invention have been described in more detail above, the present invention is not necessarily limited to these embodiments, and various modifications may be made without departing from the spirit of the present invention. Therefore, the embodiments disclosed in the present invention are not intended to limit the technical spirit of the present invention, but to explain, and the scope of the technical spirit of the present invention is not limited by these embodiments.

Therefore, it should be understood that the embodiments described above are illustrative in all respects and not restrictive. The scope of protection of the present invention should be construed according to the following claims, and all technical ideas falling within the scope of the same shall be construed as falling within the scope of the present invention.

The invention claimed is:

1. A pest identifying and information monitoring system, the system comprising:
   an image input means configured to photograph a pest and transmit an image of the pest;
   a central server connected to a network to receive pest image data of the image input means, analyze the pest image data, specify a pest in the image of the pest, and generate pest identification data; and
a user terminal configured to receive the pest identification data and displays the received pest identification data on a screen,
wherein the central server further comprises:
a pest machine learning unit configured to build a pest learning model through machine learning of multiple pest images;
a pest database unit configured to store a pest learning model constructed through the pest machine learning unit;
a pest image analysis unit configured to specify a pest by analyzing the image of the pest transmitted by the image input means using a pest learning model stored in the pest database unit;
a detection recording unit configured to record a detection time when a pest is specified through the pest image analysis unit; and
a pest trend analysis unit configured to analyze and transmit a trend of a pest based on a result value of the pest image analysis unit or the detection recording unit,
wherein the detection recording unit is configured to record the location of the image input means that obtains the image of the specified pest.

2. The system of claim 1, wherein the pest image analysis unit calculates a degree of similarity between the image of the pest and the learning model for each pest identifier by substituting a plurality of learning models for each pest identifier built for the pest image.

3. The system of claim 2, wherein if a degree of similarity of a learning model having the highest degree of similarity among the degrees of similarity to the plurality of substituted learning models for each pest identifier is greater than or equal to a determined value, the pest image analysis unit recognizes the pest with the pest identifier of the learning model having the highest degree of similarity.

4. A monitoring method using the pest identifying and information monitoring system through image analysis according to claim 3, the method comprising:
   a pest photographing step, for photographing a pest and transmitting an image of the pest, by an image input means;
   a pest analysis and specification step, for analyzing the image of the pest using a pest learning mode through a pest image analysis unit to specify a pest; and
   a pest information notification step, for transmitting the specified pest information to a user terminal by the central server.

5. A monitoring method using the pest identifying and information monitoring system through image analysis according to claim 2, the method comprising:
   a pest photographing step, for photographing a pest and transmitting an image of the pest, by an image input means;
   a pest analysis and specification step, for analyzing the image of the pest using a pest learning mode through a pest image analysis unit to specify a pest; and
   a pest information notification step, for transmitting the specified pest information to a user terminal by the central server.

6. The system of claim 1, wherein the central server further comprises:
   a pest information database unit configured to store pest information; and
   a pest information supply unit configured to extract information of a pest specified through the pest image analysis unit from the pest information database unit and transmits the information to the user terminal.

7. A monitoring method using the pest identifying and information monitoring system through image analysis according to claim 6, the method comprising:
   a pest photographing step, for photographing a pest and transmitting an image of the pest, by an image input means;
   a pest analysis and specification step, for analyzing the image of the pest using a pest learning mode through a pest image analysis unit to specify a pest; and
   a pest information notification step, for transmitting the specified pest information to a user terminal by the central server.

8. A monitoring method using the pest identifying and information monitoring system through image analysis according to claim 1, the method comprising:
   a pest photographing step, for photographing a pest and transmitting an image of the pest, by an image input means;

a pest analysis and specification step, for analyzing the image of the pest using a pest learning mode through a pest image analysis unit to specify a pest; and a pest information notification step, for transmitting the specified pest information to a user terminal by the central server.

9. The method of claim 8, further comprising, before the pest photographing step, a pest learning step, for learning an image of a pest using a machine learning technique to construct a plurality of learning models separated by identifiers for each pest.

10. The method of claim 8, wherein the pest analysis and specification step comprises calculating a degree of similarity between the pest image and the learning model for each pest identifier by substituting a plurality of learning models for each pest identifier with respect to the pest image, and if a learning model of an identifier having the highest degree of similarity is greater than or equal to a determined value, recognizing the pest of the pest image as a pest identifier of the learning model of the identifier having the highest degree of similarity.

11. The method of claim 8, wherein the pest information comprises at least one of a specified pest name, growth stage, breed, detection time, detection frequency, pesticide recommendation, and control operator recommendation.

* * * * *